(12) United States Patent  
Felton (10) Patent No.: US 7,618,231 B2
(45) Date of Patent: *Nov. 17, 2009

(54) BRACED TELESCOPING SUPPORT STRUT AND SYSTEM

(75) Inventor: Jarrod J. Felton, Cyrus, MN (US)

(73) Assignee: Superior Industries, L.L.C., Morris, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/315,319

(22) Filed: Dec. 2, 2008

(65) Prior Publication Data

US 2009/0078545 A1 Mar. 26, 2009

Related U.S. Application Data

(63) Continuation of application No. 11/975,205, filed on Oct. 18, 2007, now Pat. No. 7,470,101, which is a continuation of application No. 11/586,780, filed on Oct. 26, 2006, now Pat. No. 7,284,947.

(51) Int. Cl.
*B65G 41/00* (2006.01)

(52) U.S. Cl. .................................. 414/787; 198/302
(58) Field of Classification Search ................ 414/505, 414/574, 787; 198/302, 306
See application file for complete search history.

(56) References Cited

U.S. PATENT DOCUMENTS

| | | | | |
|---|---|---|---|---|
| 2,037,860 A | * | 4/1936 | Hummel | 182/207 |
| 2,875,888 A | * | 3/1959 | Swain et al. | 198/816 |
| 3,291,258 A | * | 12/1966 | Twilley | 182/211 |
| 3,552,546 A | * | 1/1971 | Rath | 198/306 |
| 3,620,579 A | * | 11/1971 | Brown et al. | 384/35 |
| 3,708,937 A | * | 1/1973 | Sterner | 52/118 |
| 3,752,298 A | * | 8/1973 | Wenger | 198/816 |
| 3,944,054 A | * | 3/1976 | Ensinger | 198/860.3 |
| 4,715,488 A | * | 12/1987 | Hewitt et al. | 193/35 R |
| 4,773,521 A | * | 9/1988 | Chen | 198/302 |
| 5,120,186 A | * | 6/1992 | Jorgenson | 414/686 |
| 5,390,777 A | * | 2/1995 | Gage | 198/306 |
| 6,053,284 A | * | 4/2000 | Fountain | 182/180.2 |
| 6,186,311 B1 | * | 2/2001 | Conner | 198/300 |
| 6,360,876 B1 | * | 3/2002 | Nohl et al. | 198/588 |
| 7,255,198 B1 | * | 8/2007 | Lo | 182/172 |
| 7,284,947 B1 | * | 10/2007 | Felton | 414/787 |
| 7,470,101 B2 | * | 12/2008 | Felton | 414/787 |
| 2005/0167197 A1 | * | 8/2005 | Logiudice | 182/107 |

* cited by examiner

*Primary Examiner*—Charles A Fox
(74) *Attorney, Agent, or Firm*—Dicke, Billig & Czaja, PLLC (57) ABSTRACT

A telescoping support strut configured to support a conveyor assembly of a portable conveyor system includes a first strut section and a second strut section configured to telescopically receive and substantially surround beams of the first strut section. The first strut section includes a first beam, an opposing generally parallel second beam, and a plurality of braces coupled between the first and second beams. The second strut section includes a first channel beam, an opposing generally parallel second channel beam, and a plurality of braces coupled between the first and second channel beams. Each channel beam comprises a perimeter wall configured to telescopically receive and substantially surround a respective beam of the first strut section. Each channel beam further configured to define a slot in the perimeter wall adjacent to facing surfaces of the respective beams of the first strut section.

15 Claims, 8 Drawing Sheets

BRACED TELESCOPING SUPPORT STRUT AND SYSTEM

CROSS-REFERENCE TO RELATED APPLICATION

This is a continuation of U.S. patent application Ser. No. 11/975,205, filed Oct. 18, 2007, now U.S. Pat. No. 7,470,101, which is a continuation of U.S. patent application Ser. No. 11/586,780, filed Oct. 26, 2006, now U.S. Pat. No. 7,284,947.

BACKGROUND

Conveyor systems are used in stockpiling rock, grain, and/or other aggregate material. In general, a portable conveyor system includes a movable support frame, a conveyor assembly mounted on the support frame at a feed end of the frame, and a support strut extending between the support frame and the conveyor assembly. The frame includes wheels for transporting the conveyor system to a desired stockpile site, for example. In this regard, the conveyor assembly and conveyor support can be folded or retracted onto the frame for transportation, and unfolded or extended from the frame to convey materials. During use, the support strut extends to elevate and support the conveyor assembly, which enables the formation of uniform "in-spec" stockpiles that are many meters in height.

Conveyor systems have proven useful in agricultural, mining, and other industries. These industries desire to form larger in-spec stockpiles. With this in mind, improvements to support struts of portable conveyor systems will be accepted and beneficial to the agricultural, mining, and other industries.

SUMMARY

The present invention is directed to a telescoping support strut configured to support a conveyor assembly of a portable conveyor system relative to a base frame. The support strut comprises a first strut section and a second strut section. The first strut section has a first hollow tubular beam and a second hollow tubular beam. The first and second beams are spaced apart and generally parallel to one another. A surface of the first beam faces a surface of the second beam along a length of the first strut section. The facing surfaces of the first and second beam each have a width. The first strut section further has a plurality of braces connected to the facing surfaces of the first and second beams. The plurality of braces have a width less than the width of the facing surfaces of the first and second beams. The first and second beams of the first strut section each have a first end and a second end. A connector at the first end of each of the first and second beams is configured to pivotally connect to the conveyor assembly of the portable conveyor system. The second strut section has a first channel beam and a second channel beam, each of which has a generally equal length and is generally parallel to one another. The first and second channel beams each comprise a generally C-shaped perimeter wall having first, second and third wall portions and an elongate opening that extend the length of the first and second channel beams. The first and third wall portions are generally parallel to one another. The elongate opening of the first channel beam faces the elongate opening of the second channel beam. A plurality of braces are coupled between the respective first and third wall portions of the perimeter wall of the first and second channel beams. The first and second channel beams each have a first end configured to pivotally connect to the base frame of the portable conveyor system and a second end configured to receive the second ends of the first and second beams, respectively, of the first strut section. The first strut section is movable within the second strut section. First and second telescoping hydraulic cylinders extend along the second strut section between the first and second channel beams. The first and second hydraulic cylinders are connected to the first strut section to telescopically extend the first strut section relative to the second strut section.

DETAILED DESCRIPTION

Figure 1:
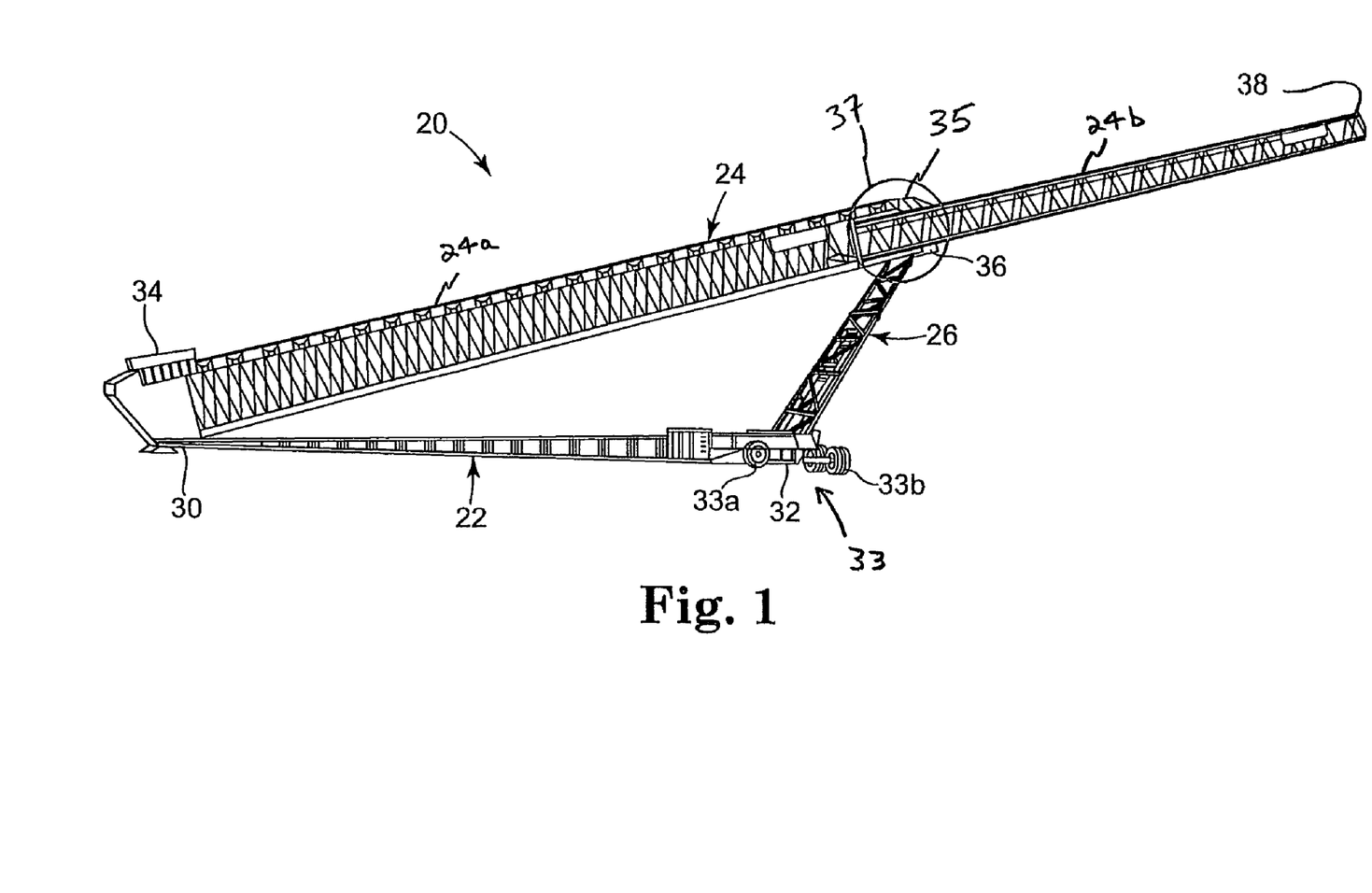
FIG. 1 is a perspective view of a portable conveyor system including a telescoping conveyor support according to one embodiment of the present invention.

FIG. 1 is a simplified perspective view of a portable conveyor system 20 according to one embodiment of the present invention. Portable conveyor system 20 includes a base frame 22, a conveyor assembly 24, and a telescoping support strut 26 coupled between frame 22 and conveyor assembly 24. A portion 37 of conveyor system 20 has been selectively cross-sectioned in the view of FIG. 1 to better illustrate telescoping portions of conveyor assembly 24.

Frame 22 is provided to support conveyor assembly 24 during use, and enables movement and transportation of portable conveyor system 20. In one embodiment, frame 22 includes a first end 30 and a second end 32, where first end 30 includes a trailer hitch (not shown) suited for coupling to a transportation tractor, for example. Second end 32 includes an undercarriage 33 with wheels 33a for road transportation of conveyor system 20 and wheels 33b for moving or otherwise pivoting second end 32 radially about first end 30.

Conveyor assembly 24 comprises a first conveyor section 24a and a second conveyor section 24b that is telescopically movable relative to the first conveyor section 24a. First conveyor section 24a extends between a feed end 34 and a first discharge end 36. Feed end 34 is coupled to first end 30 of frame 22. First discharge end 36 is vertically movable to vary a height of material discharged from conveyor assembly 24. Second conveyor section 24b includes a first end 35 and a second discharge end 38. Extension of the second conveyor section 24b relative to first conveyor section 24a increases the distance material carried by conveyor system 20 can be transported, as well as a height of second discharge end 38. Increasing the height of second discharge end 38 enables formation of higher aggregate stockpiles, such that more aggregate material can be stored on a given footprint of land.

Telescoping support strut 26 is coupled to and extends between second end 32 of frame 22 and first discharge end 36 of first conveyor section 24*a* to provide variable positioning of first discharge end 36. Support strut 26 can be extended to enable conveyor assembly 24 to increase the height of material stockpiled.

Embodiments of the present invention provided for a fully braced telescoping support strut 26 that is more rigid, and thus more stable, across all ranges of operations, and particularly when second end 32 is deployed on a less than ideally smooth runway, and when support strut 26 is extended to elevate first discharge end 36 of first conveyor section 24*a*.

Figure 2:
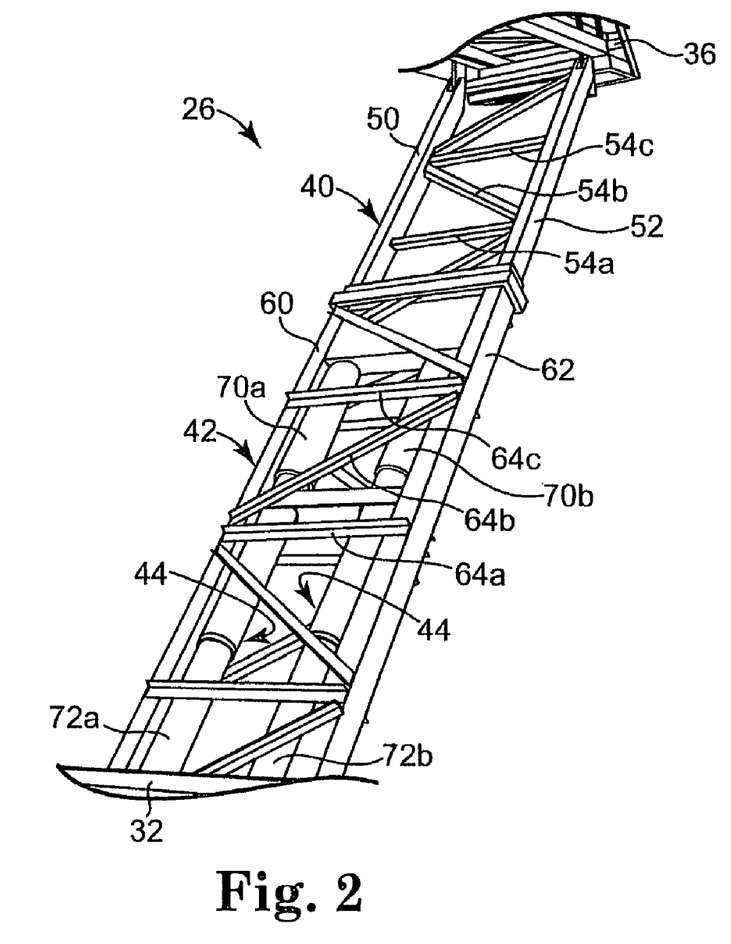
FIG. 2 is a perspective view of the telescoping conveyor support illustrated in FIG. 1.

FIG. 2 illustrates a perspective view of telescoping support strut 26 according to one embodiment of the present invention. Telescoping support strut 26 includes a first braced undercarriage or support section 40, a second: braced undercarriage or support section 42, and a hydraulic system 44 coupled between second end 32 of frame 22 (FIG. 1) and first braced undercarriage section 40.

In one embodiment, first braced undercarriage section 40 includes a first beam 50, an opposing second beam 52, and inner braces 54*a*, 54*b*, 54*c* extending between first beam 50 and second beam 52. In one embodiment, second braced undercarriage section 42 includes a first channel beam 60, an opposing second channel beam 62, and outer braces 64*a*, 64*b*, 64*c* coupled between first channel beam 60 and second channel beam 62.

In general, first braced undercarriage section 40 is reinforced by inner braces 54*a*, 54*b*, 54*c*, and second braced undercarriage section 42 is reinforced by outer braces 64*a*, 64*b*, 64*c*. Second undercarriage section 42 is configured to receive inner braces 54*a*, 54*b*, 54*c* when first undercarriage section 40 slides within the channel beams 60, 62. In this manner, each of the undercarriage sections 40, 42 are reinforced by bracing, and first braced undercarriage section 40 can slide within second braced undercarriage section 60 to vary a position of first discharge end 36 of conveyor assembly 24 (FIG. 1).

In one embodiment, hydraulic system 44 includes a pair of hydraulic cylinders 70*a*, 70*b* and a pair of telescoping hydraulic pistons 72*a*, 72*b* coupled to a respective one of the hydraulic cylinders 70*a*, 70*b*. In one embodiment, hydraulic cylinders 70*a*, 70*b* are coupled to first undercarriage section 40 parallel to a respective one of beams 50, 52, and telescoping hydraulic pistons 72*a*, 72*b* extend from frame 22 (FIG. 1) along a respective one of opposing channel beams 60, 62 to couple into hydraulic cylinders 70*a*, 70*b*. Other orientations for hydraulic system 44 relative to first undercarriage section 40 and second undercarriage section 42 are also acceptable. In one embodiment, hydraulic cylinders 70*a*, 70*b* are each three-stage hydraulic cylinders, although other hydraulic cylinder forms are also acceptable.

Figure 3:
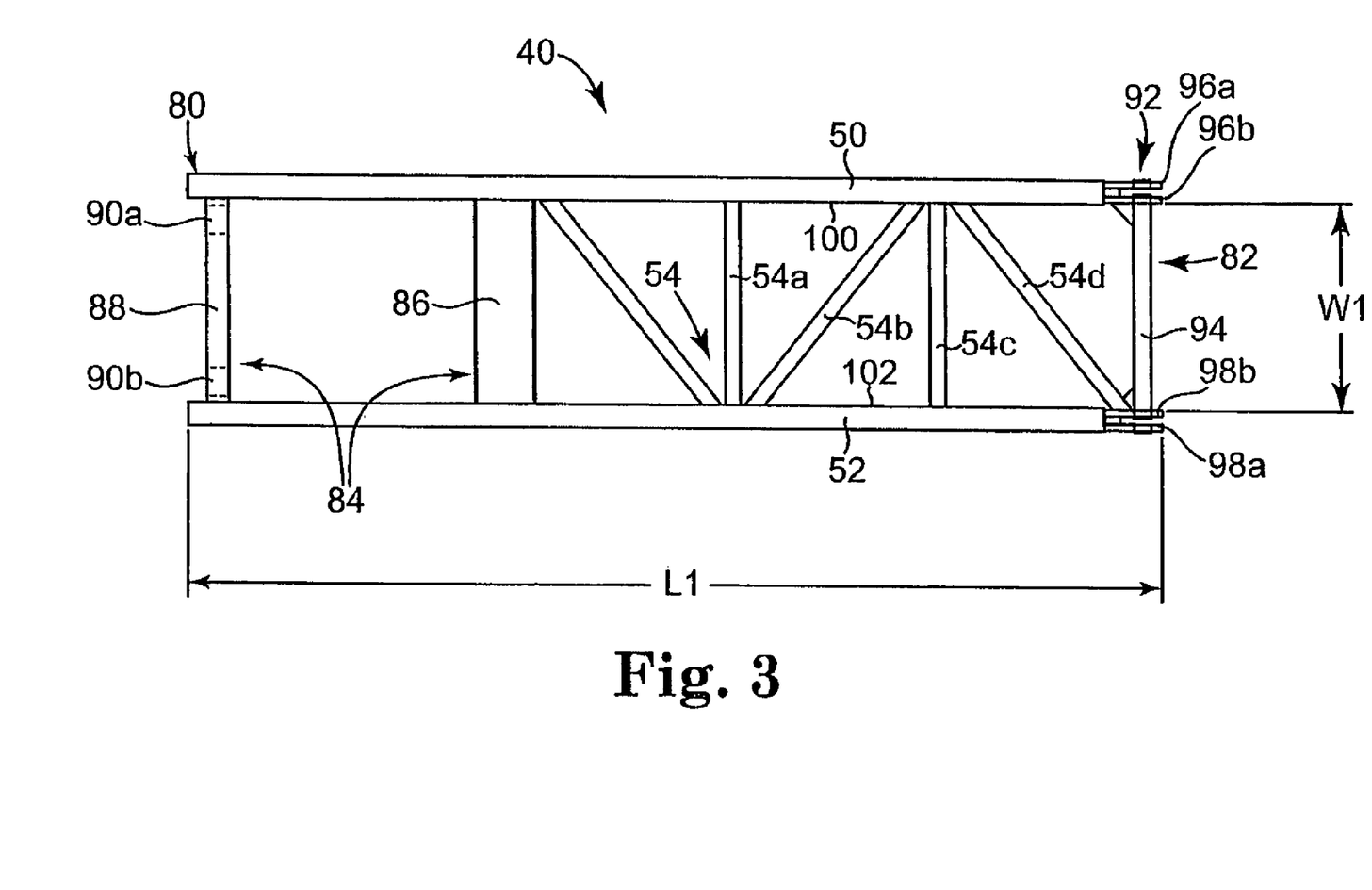
FIG. 3 is a top view of a first braced undercarriage section of the telescoping conveyor support illustrated in FIG. 2.

FIG. 3 illustrates a top view of first braced undercarriage section 40. First undercarriage section 40 includes a ram end 80 opposite a conveyor end 82, where first and second beams 50, 52 extend between ram end 80 and conveyor end 82. As best illustrated in FIG. 2 above, when operational, ram end 80 is received within and telescopes relative to second undercarriage section 42 and conveyor end 82 couples to first discharge end 36 of conveyor assembly 24.

In one embodiment, ram end 80 includes a hydraulic coupling assembly 84 that includes a cross member 86 extending between first and second beams 50, 52, and a support 88 disposed at the ram end 80. In one embodiment, cross member 86 is a steel plate that is spaced from ram end 80 and extends between beams 50, 52. In one embodiment, hydraulic cylinders 70*a*, 70*b* (FIG. 2) are coupled to cross member 86 adjacent a respective one of first and second beams 50, 52 and extend from cross member 86 through access ports 90*a*, 90*b* formed in support 88.

Conveyor end 82 includes a coupling structure 92 that is suited for rotatably coupling conveyor end 82 to first discharge end 36 of conveyor assembly 24 (FIG. 1). In particular, coupling structure 92 includes a tubular member 94 that is aligned with a first set of ears 96*a*, 96*b* and an opposing second set of ears 98*a*, 98*b*. Ears 96*a* and 96*b* are spaced relative to one another, as are ears 98*a* and 98*b*. Each set of ears 96*a*,*b* and 98*a*,*b* receive a tongue (shown generally in FIG. 2) extending from opposing sides of first discharge end 36 of conveyor assembly 24. A retaining pin (not shown) is inserted through hollow tubular member 94 and ears 96*a*,*b* and 98*a*,*b* (and through the tongues of conveyor assembly 24) to rotatably couple conveyor end 82 of first undercarriage section 40 to first discharge end 36 of conveyor assembly 24.

In one embodiment, beams 50, 52 are hollow tubular members configured to provide a maximum amount of torsional rigidity with a minimum amount of weight. One suitable material for beams 50, 52 includes steel, although other metals, including non-magnetic metals, are also acceptable. In general, first undercarriage section 40 is reinforced by inner braces 54 that extend between interior faces 100, 102 of beams 50, 52, respectively. In this regard, in one embodiment inner braces 54 are tubular members that are formed of materials that are weldable to beams 50, 52, such as steel for example. In an alternative embodiment, braces 54 are mechanically fastened to beams 50, 52 by bolts, clips, or other suitable fastening devices.

In one embodiment, beams 50, 52 extend a length L1 of about 238 inches, although other dimensions for beams 50, 52 are also acceptable. In one embodiment, opposing interior faces 100, 102 are offset from one another by a width W1 of about 54 inches, although other dimensions for separating opposing faces 100, 102 are also acceptable.

Figure 4A:
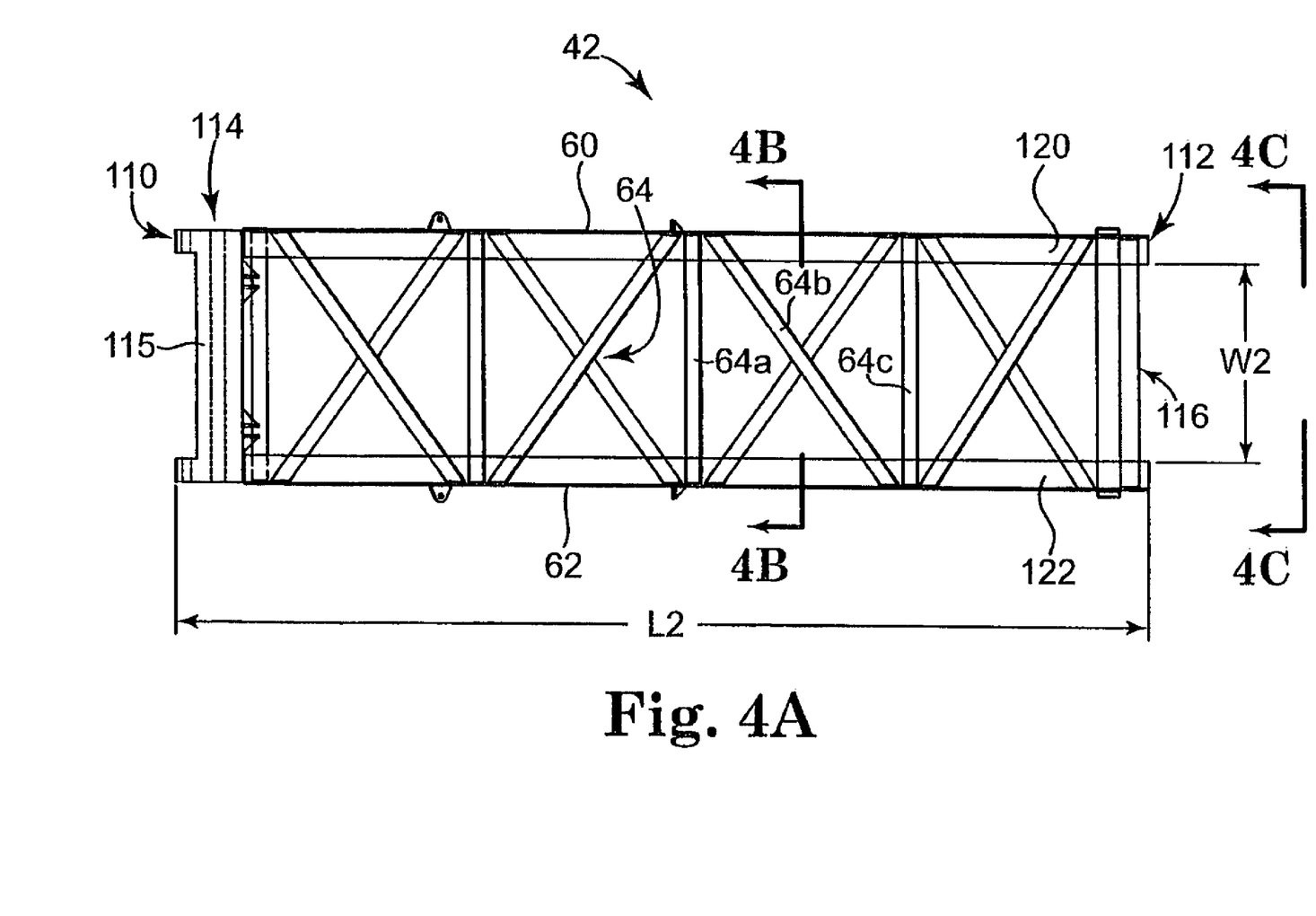
FIG. 4A is a top view of a second braced undercarriage section of the telescoping conveyor support illustrated in FIG. 2.

FIG. 4A illustrates a top view of second braced undercarriage section 42. Second undercarriage section 42 includes a pivot end 110 opposite an open end 112, and channel beams 60, 62 extend between pivot end 110 and open end 112.

Pivot end 110 includes a pivot assembly 114 configured to coupled to frame 22 (FIG. 1). In one embodiment, pivot assembly 114 includes a tube 115 that defines a through-bore that is configured to receive a coupling pin (not shown) attachable to frame 22, where the coupling pin defines an axle about which pivot end 110 rotates relative to frame 22, as is known in the art.

Open end 112 is configured to receive first undercarriage section 40 (FIG. 3). In particular, channel beams 60, 62 of second braced undercarriage section 42 terminate at open end 112 such that open end 112 is suited to receive ram end 80 of first undercarriage section 40. In one embodiment, open end 112 includes a box frame 116 that is disposed around an outer periphery of first and second channel beams 60, 62. Box frame 116 supports and reinforces open end 112 of second undercarriage section 42, and thus stabilizes telescoping support strut 26 (FIG. 2) during extension of first undercarriage section 40 beyond second undercarriage section 42.

Second undercarriage section 42 is reinforced by outer braces 64*a*, 64*b*, 64*c* that extend between exterior faces 120, 122 of channel beams 60, 62, respectively. In one embodiment, second undercarriage section 42 includes top exterior faces 120, 122 (as illustrated) and bottom exterior faces (not visible), and outer braces 64 are provided that extend between both top exterior faces 120, 122 and bottom exterior faces.

While an alternating configuration of outer braces 64 is illustrated, it is to be understood that other configurations for outer braces 64 are also acceptable.

In one embodiment, channel beams 60, 62 are modified hollow tubular members configured to provide a maximum amount of torsional rigidity with a minimum amount of weight. One suitable material for channel beams 60, 62 includes steel, although other metals, including non-magnetic metals, are also acceptable. In one embodiment, outer braces 64 are metal plates, for example angle iron, that extend between opposing exterior faces 120, 122 of channel beams 60, 62, respectively. In general, outer braces 64 are formed of materials that are weldable to channel beams 60, 62, such as steel for example. In an alternative embodiment, outer braces 64 are mechanically fastened to channel beams 60, 62 by bolts, clips, or other suitable fastening devices.

In one embodiment, channel beams 60, 62 extend a length L2 between pivot end 110 and open end 112 of about 230 inches, although other dimensions are also acceptable. In one embodiment, first channel beam 60 is spaced a width W2 apart from second channel beam 62, where width W2 is about 59 inches, although other dimensions that enable second undercarriage section 42 to receive ram end 80 of first undercarriage section 40 (FIG. 3) are also acceptable.

Figure 4B:
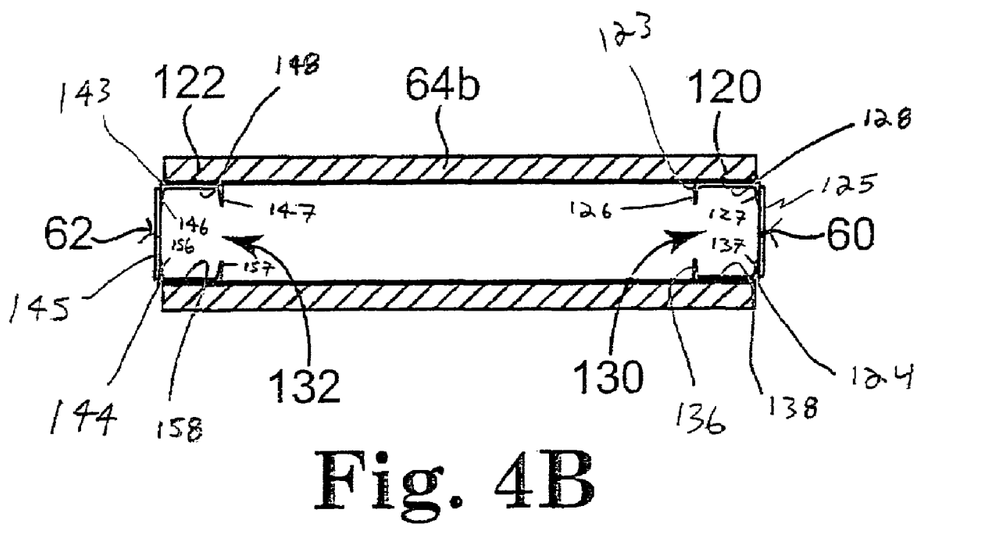
FIG. 4B is a cross-sectional view of the second braced undercarriage section taken along line 4B-4B of FIG. 4A.

FIG. 4B illustrates a cross-sectional view of second undercarriage section 42 taken along line 4B-4B of FIG. 4A. Outer brace 64*b* extends from exterior face 120 of first channel beam 60 to exterior face 122 of second channel beam 62.

First channel beam 60 includes a first U-shaped beam 123, a second U-shaped beam 124, and a plate 125 coupled to first and second U-shaped beams 123, 124. First U-shaped beam 123 defines a first leg 126, a second leg 127, and a base 128 connecting between first and second legs 126, 127. As a point of reference, base 128 of first U-shaped beam 123 is coincident with surface 120 of first channel beam 60. Second U-shaped beam 124 defines a first leg 136, a second leg 137, and a base 138 connecting between first and second legs 136, 137. Plate 125 is coupled between second legs 127, 137 of first and second U-shaped beams 123, 124, respectively, to define channel slot 130. The configuration of first channel beam 60 defines a channel arrangement that provides three complete sides (base 128, plate 125, base 138) and one partial fourth side (defined by legs 126, 136) that combine to substantially surround beam 50 of the first strut section 40 when support 26 is assembled.

Second channel beam 62 includes a first U-shaped beam 143, a second U-shaped beam 144, and a plate 145 coupled to first and second U-shaped beams 143, 144. First U-shaped beam 143 defines a first leg 146, a second leg 147, and a base 148 connecting between first and second legs 146, 147. As a point of reference, base 148 of first U-shaped beam 143 is coincident with surface 122 of second channel beam 62. Second U-shaped beam 144 defines a first leg 156, a second leg 157, and a base 158 connecting between first and second legs 156, 157. Plate 145 is coupled between first legs 146, 156 of first and second U-shaped beams 143, 144, respectively, to define channel slot 132. The configuration of second channel beam 62 defines a channel arrangement that provides three complete sides (base 148, plate 145, base 158) and one partial fourth side (defined by legs 147, 157) that combine to substantially surround beam 52 of the second strut section 42 when support 26 is assembled.

Channel beams 60, 62 are configured to surround substantially all four sides of the respective beams that they engage with. In this regard, channel beams 60, 62 can be fabricated in forms other than that described above. For example, channel beams 60, 62 can be fabricated by milling or removing a longitudinal slot on one side of an annular beam, or by cross-bracing two opposing C-shaped beams, where the C-shaped beams include walls defining a slot that are configured to surround substantially all four sides of the respective beams that they engage with.

Channel slots 130, 132 are sized to permit passage of inner braces 54, cross member 86, and support 88 of first undercarriage section 40 (FIG. 3). In one embodiment, channel slots 130, 132 extend an entirety of the length L2 of channel beams 60, 62 between pivot end 110 and open end 112 (FIG. 4A).

Channel beams 60, 62 are generally C-shaped, although other shapes that include slots 130, 132 are also acceptable. In this regard, channel slots 130, 132 are oriented to "face" one another and are sized to provide a clearance that enables first undercarriage section 40 (FIG. 3) to slide unimpeded within second undercarriage section 42. For example, in one embodiment inner braces 54 (FIG. 3) are tubular members having an outside dimension of about 4 inches square, and channel slots 130, 132 define an opening slightly greater than 4 inches such that inner braces 54 will slide between channel slots 130, 132. In a similar manner, channel slots 130, 132 are sized to provide clearance for cross member 86 and support 88 (FIG. 3) when first undercarriage section 40 slides within second undercarriage section 42. Other suitable dimensions that enable channel slots 130, 132 to slidingly receive portions of first undercarriage section 40 are also acceptable.

Figure 4C:
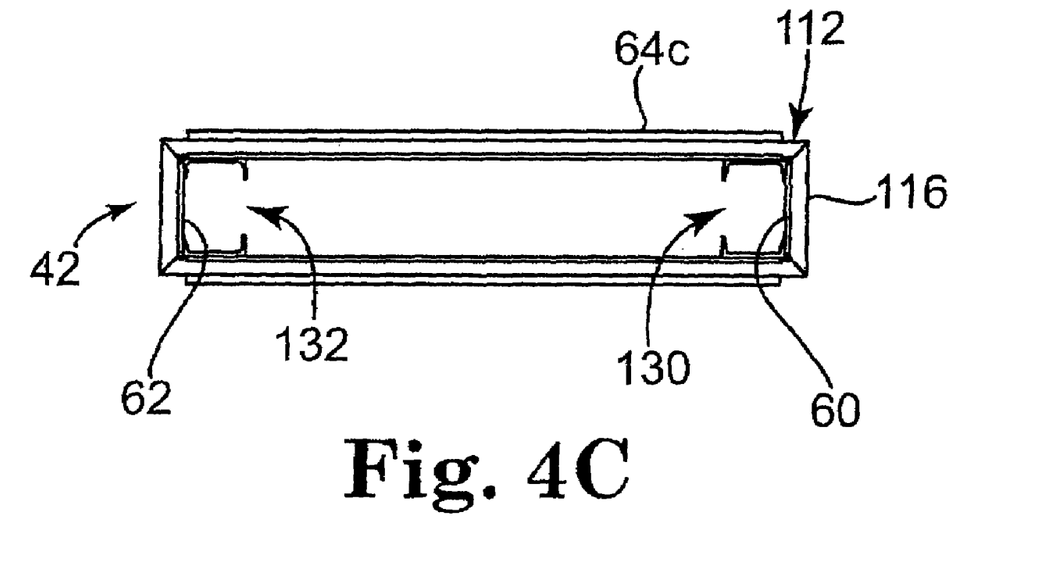
FIG. 4C is an end view of the second braced undercarriage section of FIG. 4A.

FIG. 4C illustrates an end view of open end 112 of second undercarriage section 42. Box frame 116 extends around a periphery of open end 112 to reinforce first channel beam 60 and second channel beam 62. In one embodiment, box frame 116 includes four tubular members welded about a periphery of open end 112. In other embodiments, box frame 116 includes solid plates, for example, secured about a periphery of open end 112.

In general, box frame 116 is formed of materials that are weldable to channel beams 60, 62, such as steel for example. In other embodiments, box frame 116 is mechanically fastened to channel beams 60, 62 by bolts, clips, or other suitable fastening devices. In any regard, open end 112 is reinforced by box frame 116 and channel beams 60, 62 are available to receive beams 50, 52, respectively, of first undercarriage section 40 (FIG. 2).

Figure 5:
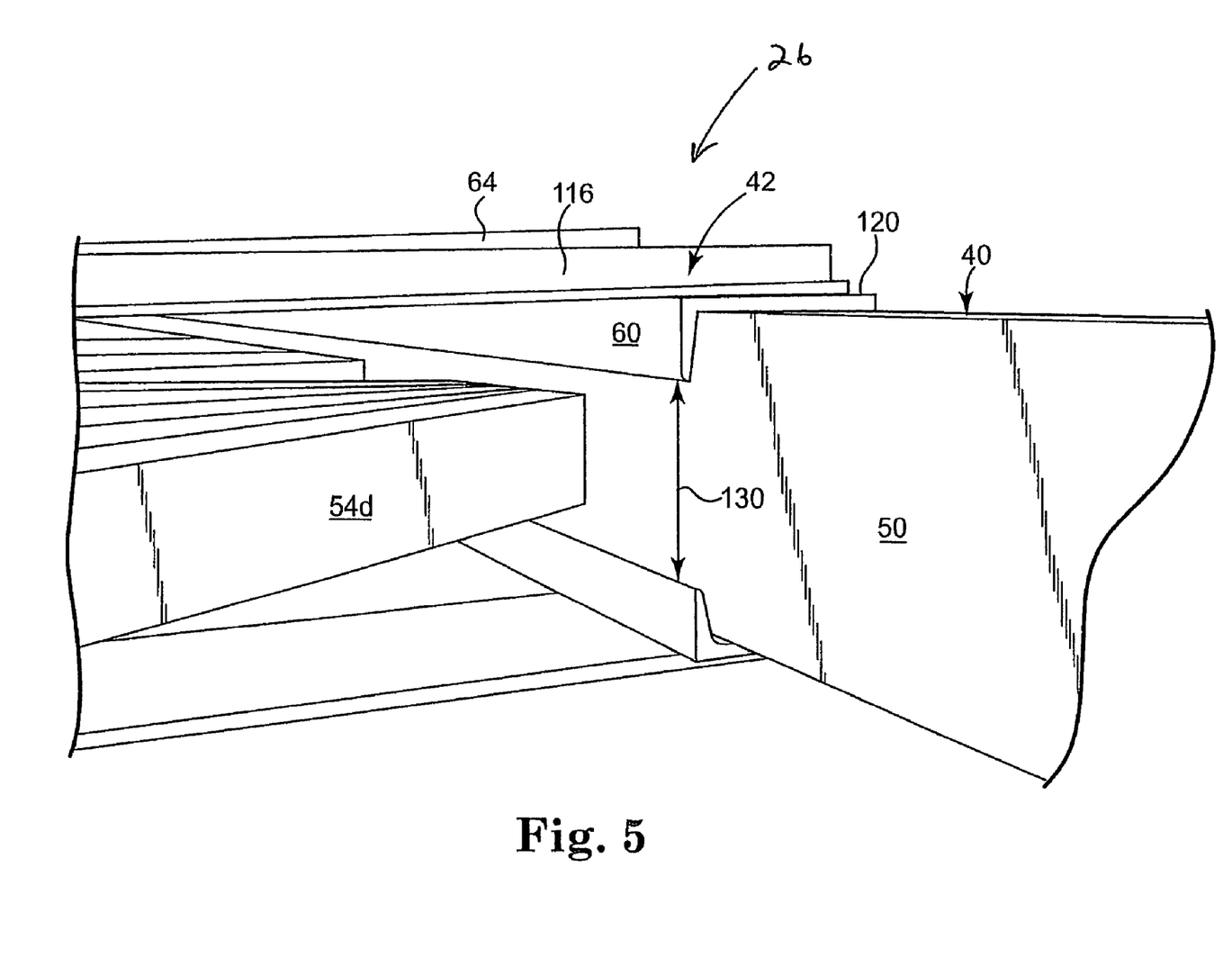
FIG. 5 is an enlarged partial perspective view of the first braced undercarriage section slidably retained within the second braced undercarriage section according to one embodiment of the present invention.

FIG. 5 illustrates an enlarged partial perspective view of support strut 26 with first braced undercarriage section 40 slidingly engaged within second braced undercarriage section 42 according to one embodiment of the present invention. Inner braces 54 is centered within the opposing inner faces of beams 50, 52 of first undercarriage section 40, as illustrated by inner brace 54*d* and beam 50. Channel beam 60 is provided with channel slot 130 that is sized to receive inner braces 54 (brace 54*d* is illustrated) of first undercarriage section 40. In this manner, beam 50 of first undercarriage section 40 is surrounded on all four sides by channel beam 60 of second undercarriage section 42.

First undercarriage section 40 is braced by inner braces 54, cross member 86 and support 88 (FIG. 3), and these components slide unimpeded through channel slot 130 when first undercarriage section 40 telescopes within second undercarriage section 42. Second undercarriage section 42 is braced by outer braces 64 (one visible) that extend between exterior faces 120, 122 (exterior face 120 is shown) of channel beams 60, 62, respectively. In this manner, both of the first undercarriage section 40 and the second undercarriage section 42 are braced and reinforced against undesired torsional twisting, and channel beams 60, 62 of second undercarriage section 42 include reinforced slots 130, 132 that permit first undercarriage section 40 to slide within second undercarriage section 42.

Figure 6:
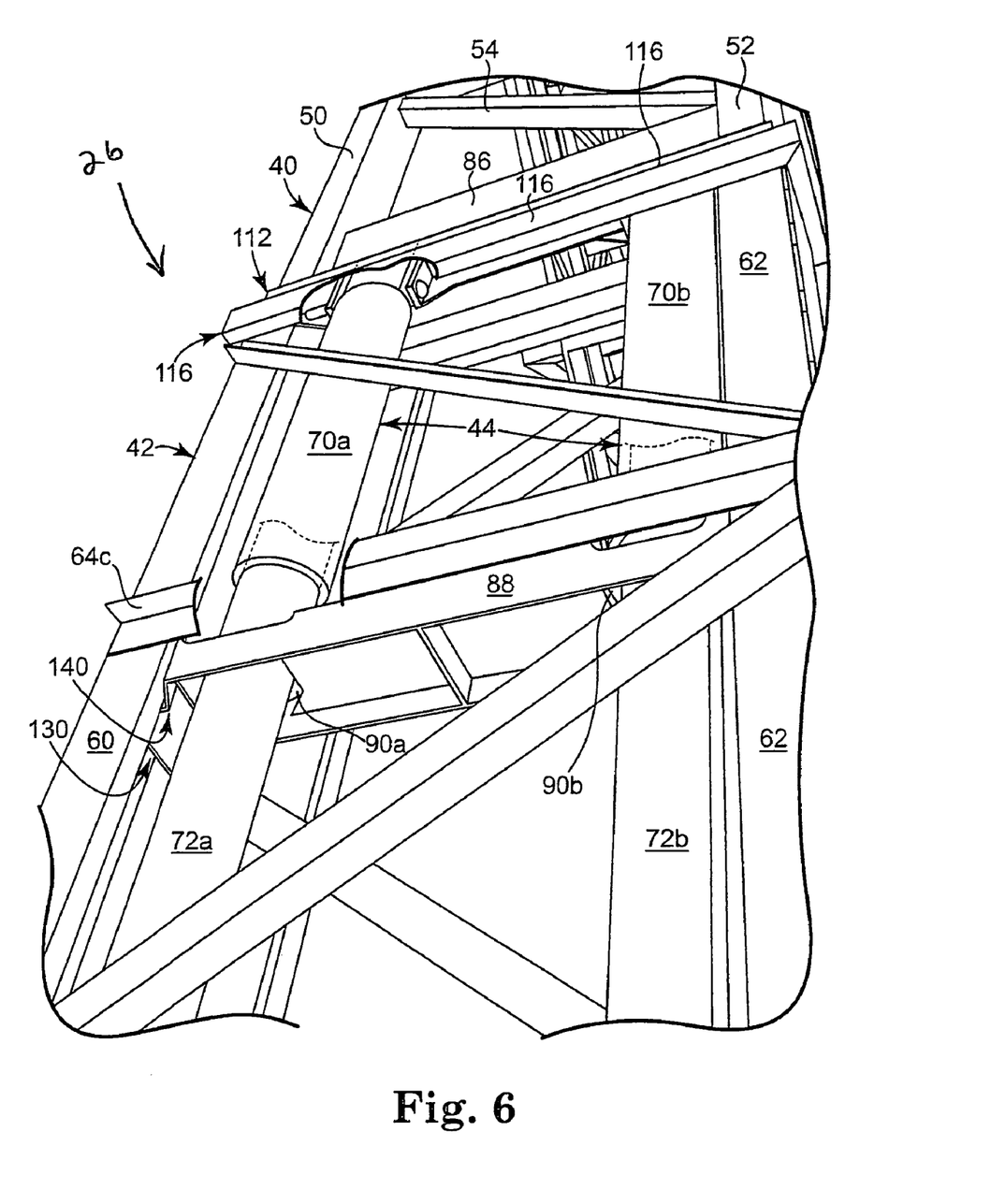
FIG. 6 is an enlarged partial perspective view of an assembled telescoping conveyor support including a hydraulic system according to one embodiment of the present invention.

FIG. 6 illustrates an enlarged partial perspective view of support strut 26 with first undercarriage section 40 operably connected to second undercarriage section 42 and including hydraulic system 44 according to one embodiment of the present invention. Support 88 generally defines a lowermost portion of first undercarriage section 40. Second undercarriage section 42 includes open end 112 reinforced by box frame 116 and channel beams 60, 62 sized to receive beams 50, 52, respectively. Box frame 116 is generally disposed at a topmost portion of second undercarriage section 42. With this in mind, FIG. 6 illustrates that first undercarriage section 40 is extended out of second first undercarriage section 42. Hydraulic pistons 72a, 72b pass through access ports 90a, 90b, respectively, of support 88, and hydraulic cylinders 70a, 70b telescope relative to pistons 72a, 72b and are attached to cross member 86. In one embodiment, cross member 86 and support 88 are spaced apart one from the other by about 1-5 feet, although other dimensions are also acceptable.

In general, slots 130, 132 of second undercarriage section 42 provide clearance for cross member 86 to slide within second undercarriage section 42. Support 88 extends between beams 50, 52, and includes tucks 140 where support 88 is attached to beams 50, 52. Tucks 140 configure support 88 to be wider than the slots 130, 132 through which support 88 slides. In this manner, support 88 accommodates access ports 90a, 90b, which are necessarily wider than the hydraulic cylinders 70a, 70b that they receive. To this end, support 88 is wider than the hydraulic cylinders 70a, 70b and slots 130, 132, but tucks 140 are configured to enable support 88 to slide within slots 130, 132 of second undercarriage section 42.

Reference is made to a cut-away section of box frame 116 that illustrates hydraulic cylinder 70a of hydraulic system 44 coupled to cross member 86 and aligned with access port 90a formed in support 88. Access ports 90a, 90b are sized to permit the passage of a respective one of hydraulic pistons 72a, 72b that extend from frame 22 (FIG. 1) and telescope into hydraulic cylinders 70a, 70b, respectively. When hydraulic system 44 is activated, pistons 72a, 72b extend through access ports 90a, 90b, respectively, to move first braced undercarriage section 40 relative to second braced undercarriage section 42. In particular, first undercarriage section 40 is slidable within second undercarriage section 42 between a retracted position in which conveyor end 82 (FIG. 3) is substantially adjacent to open end 112, to an extended position in which ram end 80 (FIG. 3) is substantially adjacent to open end 112.

Reference is made to a cut-away section of outer brace 64c of second undercarriage section 42 that illustrates access port 90a formed in support 88. Support 88 extends between beams 50, 52 of first undercarriage section 40, and in one embodiment includes tucks 140 that taper to fit within channel slots 130, 132 (slot 130 is illustrated). In this manner, support 88 is robustly sized to have a width that is wider than channel slot 130, for example, and yet tuck 140 enables support 88 to slide within channel slot 130. In this manner, support 88 is "oversized" and suited to accommodate formation of access port 90a without a deleterious reduction in ultimate strength, which contributes to support 88 rigidly stabilizing first undercarriage section 40.

With additional reference to FIG. 1, when conveyor system 20 is employed to form an in-spec aggregate stockpile, conveyor assembly 24 and support strut 26 are unfolded from frame 22, and support strut 26 raises conveyor assembly 24 into a desired elevated position. The stockpile is formed as aggregate material cascades from the first discharge end 36 into a pile. As the aggregate stockpile grows, second discharge end 38 is extended away from first discharge end 36 to build the aggregate stockpile upwards. Wheels 33b are used to move frame 22 in a radial arc on a runway to build the aggregate stockpile laterally.

Telescoping support strut 26 is provided to extend discharge end 36 upward and outward from frame 22. In this regard, telescoping support strut 26 is fully braced across both a first braced undercarriage section 40 (FIG. 2) and a second braced undercarriage section 42 (FIG. 2) that enables first braced undercarriage section 40 to extend away from second braced undercarriage section 42 and resist torsion or other twisting movements initiated by forces at extended second discharge end 38. As a consequence, conveyor system 20 has improved stability and accommodates operation on runways that are less than ideally level and less than ideally maintained.

In addition, the improved stability and rigidity of telescoping support strut 26 contributes to equalized pressures within opposing sides of hydraulic system 44. For example, when first braced undercarriage section 40 is extended away from second braced undercarriage section 42, the mutually braced sections 40, 42 minimize twisting of the extended section 40. When twisting is minimized, any unbalanced lateral forces relative to system 20 are also minimized, which enables the pressures within hydraulic system 44 to be balanced. As a consequence, hydraulic pressures in the opposing sides of hydraulic system 44 are about equal, which enables hydraulic system 44 to extend beams 50, 52 even further in a balanced manner. Thus, the fully braced support strut 26 is more stable when extended, and more readily accommodates operation of conveyor system 20 on a runway that deviates from ideally level.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A telescoping support strut configured to support a conveyor assembly of a portable conveyor system relative to a base frame, the support strut comprising:

a first strut section having a first hollow tubular beam and a second hollow tubular beam, the first and second beams being spaced apart and generally parallel to one another, a surface of the first beam facing a surface of the second beam along a length of the first strut section, the facing surfaces of the first and second beam each having a width, the first strut section further having a plurality of braces connected to the facing surfaces of the first and second beams, the first and second beams of the first strut section each having a first end and a second end, and a connector at the first end configured to pivotally connect to the conveyor assembly of the portable conveyor system;

a second strut section having a first channel beam and a second channel beam, the first and second channel beams having a generally equal length and being generally parallel to one another, the first and second channel beams each comprising a generally C-shaped perimeter wall having first, second and third wall portions and an elongate opening that extend the length of the first and second channel beams, the first and third wall portions being generally parallel to one another, the elongate opening of the first channel beam facing the elongate opening of the second channel beam, and a plurality of braces coupled between respective first and third wall portions of the perimeter wall of the first and second channel beams, the first and second channel beams each having a first end configured to pivotally connect to the base frame of the portable conveyor system and a second end configured to receive the second ends of the first and second beams, respectively, of the first strut section, the first strut section movable within the second strut section; and first and second telescoping hydraulic cylinders extending along the second strut section between the first and second channel beams, the first and second hydraulic cylinders connected to the first strut section to telescopically extend the first strut section relative to the second strut section.

2. The telescoping support strut of claim 1, wherein the first strut section has a length greater than that of the second strut section.

3. The telescoping support strut of claim 1, wherein the first and second hydraulic cylinders are connected to the first strut section at a point spaced from the second ends of the first and second beams of the first strut section.

4. The telescoping support strut of claim 1, wherein the plurality of braces of the first strut section are generally centered relative to the width of the facing surfaces of the first and second beams of the first strut section.

5. The telescoping support strut of claim 1, wherein each channel beam of the second strut section further comprises a fourth wall portion connected to the first wall portion along its length, the fourth wall portion having a width less than the second wall portion and extending in a direction toward the third wall portion.

6. The telescoping support strut of claim 5, wherein each channel beam of the second strut section further comprises a fifth wall portion connected to the third wall portion along its length, the fifth wall portion having a width less than the second wall portion and extending in a direction toward the first wall portion.

7. A telescoping support strut configured to support a conveyor assembly of a portable conveyor system, the support strut comprising:

a first strut section having a first beam, an opposing generally parallel second beam, and a plurality of braces coupled between facing surfaces of the first and second beams, the first strut section having a first end and a second end; and a second strut section having a first generally C-shaped channel beam with an elongate channel, an opposing generally parallel second generally C-shaped channel beam with an elongate channel, the elongate channels of the first and second channel beams facing one another, and a plurality of braces coupled between outer walls of the first and second channel beams, each channel beam of the second strut section having an open end configured to telescopically receive the second end of a respective beam of the first strut section;

a box frame secured about the first and second channel beams adjacent to the open ends of the first and second channel beams; and a pair of hydraulic cylinders connected between the second strut section and the first strut section and positioned between the first and second channel beams;

wherein the first strut section is slideable within the second strut section when the pair of hydraulic cylinders are actuated such that the braces of the first strut section slide within the channels of the second strut section.

8. The telescoping support strut of claim 7, wherein the first strut section has a length greater than that of the second strut section.

9. The telescoping support strut of claim 7, wherein the pair of hydraulic cylinders are connected to the first strut section at a point spaced from the second ends of the first and second beams of the first strut section.

10. The telescoping support strut of claim 7, wherein the facing surfaces of the first and second beams have a width and the plurality of braces of the first strut section are generally centered relative to the width of the facing surfaces of the first and second beams of the first strut section.

11. The telescoping support strut of claim 7, wherein each C-shaped channel beam comprises a perimeter wall having first, second and third wall portions, and wherein a first plurality of braces of the second strut section are connected to the first wall portions of the first and second channel beams, and a second plurality of braces of the second strut section are connected to the third wall portions of the first and second channel beams.

12. The telescoping support strut of claim 11, wherein each C-shaped channel beam further comprises a fourth wall portion connected to the first wall portion along its length, the fourth wall portion having a width less than the second wall portion and extending in a direction toward the third wall portion.

13. The telescoping support strut of claim 12, wherein each C-shaped channel beam further comprises a fifth wall portion connected to the third wall portion along its length, the fifth wall portion having a width less than the second wall portion and extending in a direction toward the first wall portion.

14. A telescoping support strut configured to support a conveyor assembly of a portable conveyor system relative to a base frame, the support strut comprising:

a first strut section having a first hollow tubular beam and a second hollow tubular beam, the first and second beams being spaced apart and generally parallel to one another, a surface of the first beam facing a surface of the second beam along a length of the first strut section, the facing surfaces of the first and second beam each having a width, the first strut section further having a plurality of braces connected to the facing surfaces of the first and second beams, the first and second beams of the first strut section each having a first end and a second end, and a connector at the first end configured to pivotally connect to the conveyor assembly of the portable conveyor system;

a second strut section having a first channel beam and a second channel beam, the first and second channel beams having a generally equal length and being generally parallel to one another, the first and second channel beams each comprising a generally C-shaped perimeter wall having first, second and third wall portions and an elongate opening that extend the length of the first and second channel beams, the first and third wall portions being generally parallel to one another, the elongate opening of the first channel beam facing the elongate opening of the second channel beam, and a plurality of braces coupled between respective first and third wall portions of the perimeter wall of the first and second channel beams, the first and second channel beams each having a first end configured to pivotally connect to the base frame of the portable conveyor system and a second end configured to receive the second ends of the first and second beams, respectively, of the first strut section, the first strut section movable within the second strut section with the plurality of braces of the first strut section being movable within the elongate openings of the first and second channel beams; and first and second telescoping hydraulic cylinders extending along and parallel to the channel beams of the second strut section, the first and second hydraulic cylinders connected to the first strut section to telescopically extend the first strut section relative to the second strut section.

15. A telescoping support strut configured to support a conveyor assembly of a portable conveyor system, the support strut comprising:

a first strut section having a first beam, an opposing generally parallel second beam, and a plurality of braces coupled between facing surfaces of the first and second beams, the first strut section having a first end and a second end; and a second strut section having a first generally C-shaped channel beam with an elongate channel, an opposing generally parallel second generally C-shaped channel beam with an elongate channel, the elongate channels of the first and second channel beams facing one another, and a plurality of braces coupled between outer walls of the first and second channel beams, each channel beam of the second strut section having an open end configured to telescopically receive the second end of a respective beam of the first strut section;

a box frame secured about the first and second channel beams adjacent to the open ends of the first and second channel beams; and a pair of hydraulic cylinders connected between the second strut section and the first strut section and extending along and generally parallel to the first and second channel beams;

wherein the first strut section is slideable within the second strut section when the pair of hydraulic cylinders are actuated such that the braces of the first strut section slide within the channels of the second strut section.

* * * * *